United States Patent [19]

Stump

[11] Patent Number: 5,047,947

[45] Date of Patent: Sep. 10, 1991

[54] METHOD OF MODELING THE ASSEMBLY OF PRODUCTS TO INCREASE PRODUCTION YIELD

[75] Inventor: Joseph W. Stump, Smithtown, N.Y.

[73] Assignee: Grumman Aerospace Corporation, Bethpage, N.Y.

[21] Appl. No.: 557,697

[22] Filed: Jul. 25, 1990

[51] Int. Cl.[5] .......... G06F 15/46

[52] U.S. Cl. .......... 364/468; 364/554; 364/578

[58] Field of Search .......... 364/578, 513, 468, 401, 364/402, 156, 554

[56] References Cited

U.S. PATENT DOCUMENTS 3,891,836 7/1975 Lee .......... 364/156

4,931,944 6/1990 Richter et al. .......... 364/468

OTHER PUBLICATIONS

McClave et al., "Statistics", 1985, Delten Publishing Company.

*Primary Examiner*—Parshotam S. Lall

*Assistant Examiner*—Gary Yacura

*Attorney, Agent, or Firm*—Scully, Scott, Murphy & Presser

[57] ABSTRACT

A method for increasing the production or manufacturing yield of a product by the application of mathematical modeling techniques on the statistical distributions of major components of the product to maximize the production yield thereof. The product is assembled from a plurality of components, each of which is produced in multiple different manufacturing lots. Initially, the statistical characteristics of significant performance specifications of each major component used in the assembly of the product are established for each manufacturing lot of that component. The statistically probable performance of the product assembled with different combinations of components from different manufacturing lots is evaluated to assess the performance sensitivity of the assembled product to different combinations of the components from different manufacturing lots. As a consequence thereof, the best statistical combinations of different components from different manufacturing lots are selected to achieve the highest probable yield of assembled products with acceptable performance characteristics. The present invention is particularly applicable to the assembly of an electronic product assembled from a plurality of electronic components.

5 Claims, 4 Drawing Sheets

$$\mathrm{erf}\ x = \frac{1}{\sqrt{2\pi}}\int_0^x e^{-y^2/2}\,dy$$

| $x$ | erf $x$ | $x$ | erf $x$ |
|---|---|---|---|
| 0.05 | 0.01994 | 1.55 | 0.43943 |
| 0.10 | 0.03983 | 1.60 | 0.44520 |
| 0.15 | 0.05962 | 1.65 | 0.45053 |
| 0.20 | 0.07926 | 1.70 | 0.45543 |
| 0.25 | 0.08971 | 1.75 | 0.45994 |
| 0.30 | 0.11791 | 1.80 | 0.46407 |
| 0.35 | 0.13683 | 1.85 | 0.46784 |
| 0.40 | 0.15542 | 1.90 | 0.47128 |
| 0.45 | 0.17364 | 1.95 | 0.47441 |
| 0.50 | 0.19146 | 2.00 | 0.47725 |
| 0.55 | 0.20884 | 2.05 | 0.47982 |
| 0.60 | 0.22575 | 2.10 | 0.48214 |
| 0.65 | 0.24215 | 2.15 | 0.48422 |
| 0.70 | 0.25804 | 2.20 | 0.48610 |
| 0.75 | 0.27337 | 2.25 | 0.48778 |
| 0.80 | 0.28814 | 2.30 | 0.48928 |
| 0.85 | 0.30234 | 2.35 | 0.49061 |
| 0.90 | 0.31594 | 2.40 | 0.49180 |
| 0.95 | 0.32894 | 2.45 | 0.49286 |
| 1.00 | 0.34134 | 2.50 | 0.49379 |
| 1.05 | 0.35314 | 2.55 | 0.49461 |
| 1.10 | 0.36433 | 2.60 | 0.49534 |
| 1.15 | 0.37493 | 2.65 | 0.49597 |
| 1.20 | 0.38493 | 2.70 | 0.49653 |
| 1.25 | 0.39435 | 2.75 | 0.49702 |
| 1.30 | 0.40320 | 2.80 | 0.49744 |
| 1.35 | 0.41149 | 2.85 | 0.49781 |
| 1.40 | 0.41924 | 2.90 | 0.49813 |
| 1.45 | 0.42647 | 2.95 | 0.49841 |
| 1.50 | 0.43319 | 3.00 | 0.49865 |

PROBABILITY OF VALUE $>x$ IS .5 − erf ($x$)
PROBABILITY OF VALUE $0 \leq x$ IS erf ($x$)
erf ($x$) = − erf ($x$)

FIG. 4

METHOD OF MODELING THE ASSEMBLY OF PRODUCTS TO INCREASE PRODUCTION YIELD

BACKGROUND OF THE INVENTION

1. Field of the Invention

The present invention relates generally to a method of modeling the assembly of a product to increase the production or manufacturing yield thereof, and more particularly pertains to a method of modeling the assembly of a product constructed from a plurality of components, each of which is produced in multiple manufacturing lots, to increase the production yield of electronic products having acceptable performance characteristics. The subject invention is particularly applicable to the assembly of an electronic product assembled from a plurality of electronic components.

2. Discussion of the Prior Art

Traditionally in the military electronics manufacturing business, major electronic assemblies such as electronic modules, circuit boards, etc. are designed such that any individual component of the major assembly can be replaced by another component of the same part number that meets the component technical specifications, with no impact on the ability of the major assembly to meet the overall or top performance specification requirements of the assembly. The tolerance build-up within an electronic assembly is normally analyzed during the design phase, and component tolerances are designed and specified to ensure interchangeability. In some instances, a tolerance build-up can occur as a result of a suboptimum combination of components that yields an out of specification final product. When an electronic assembly uses a series of components which could cause a deviation from overall or top performance of the assembly specifications, trimming components are usually introduced, and during final testing, the required value of the trimming component (e.g., resistor, capacitor) is determined and inserted therein.

In the military electronics manufacturing business, the requirement for interchangeable components has been dictated by the requirements of the government for maintenance and spare components. This allows equipment to be repaired by military personnel at various maintenance levels within the military services without concern for a component selection process, which would otherwise require measuring a series of component parts until one is located that yields acceptable performance specifications.

Moreover, in the assembly of electronic products, increased automation and improved manufacturing equipment and techniques can also increase production yields, and increased inspection, testing and burn-in can further improve production yields despite faulty components. A reduction of yield due to tolerance build-up can be addressed by tightening tolerances on individual components or by understanding a priori, the nature and magnitude of the tolerance build-up problem in a given manufacturing run, and taking steps to minimize the yield of unacceptable products caused by a mismatch of components. In many instances, a traditional approach of simply tightening the tolerances of the individual components in the product can be a very costly undertaking which is not particularly cost effective.

SUMMARY OF THE INVENTION

Accordingly, it is a primary object of the present invention to provide a method for increasing the production or manufacturing yield of a product by the application of mathematical modeling techniques on the statistical distribution of major components of the product to maximize the product yield thereof. The application of such a mathematical model can provide savings by the cancellation of unacceptable production runs, and by the statistical predetermination of combinations of preferred manufacturing lots or production runs of components to be utilized in assembling the product.

A further object of the subject invention is the provision of a method of modeling the assembly of products for increased production yields of a product assembled from a plurality of components, each of which is produced in multiple different manufacturing lots, by the application of mathematical modeling on the statistical distribution of major components produced in different manufacturing lots to select preferred combinations of different components from different manufacturing lots to achieve the statistically highest probable yield of products with acceptable performance characteristics.

An additional object of the present invention is the provision of a method of modeling the assembly of electronic products assembled from a plurality of electronic components wherein the statistical characteristics are established of the significant electronic parameters of each manufacturing lot of each major electronic component used in the assembly of the electronic product.

In accordance with the teachings herein, the present invention provides a method of assembling a product from a plurality of components, each of which is produced in multiple different manufacturing lots, to increase the production yield of products having acceptable performance characteristics. Initially, the statistical characteristics of significant performance specifications of each major component used in the assembly of the product are established for each manufacturing lot of that component. The statistically probable performance of products assembled with different combinations of components from different manufacturing lots is evaluated to assess the performance sensitivity of the assembled product to different combinations of the components from different manufacturing lots. As a consequence thereof, the best statistical combinations of different components from different manufacturing lots are selected to achieve the highest probable yield of assembled products with acceptable performance characteristics.

BRIEF DESCRIPTION OF THE DRAWINGS

The foregoing objects and advantages of the present invention for a method of modeling the assembly of products to increase production yield may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 4 is a statistical table of error function (erf) as might be used pursuant to one statistical approach of the present invention.

DETAILED DESCRIPTION OF THE DRAWINGS

Figure 1A:
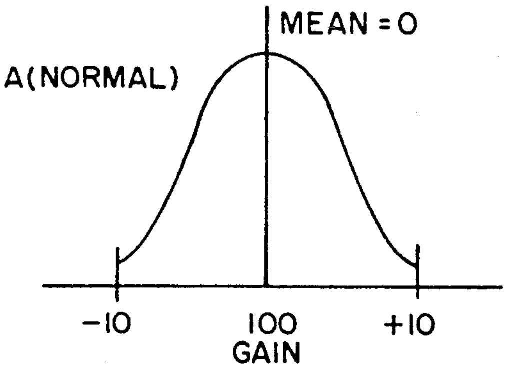
FIGS. 1A–1F illustrate typical statistical distributions of characteristics of electronic components such as ICs, hybrids as might be achieved during manufacture thereof.
Figure 1B:
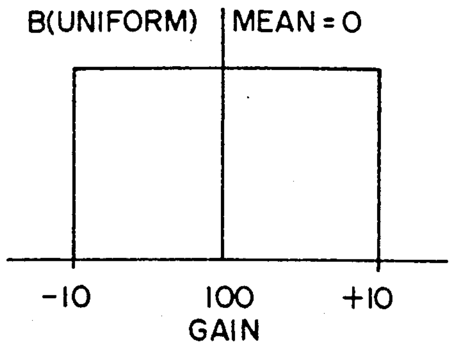
Figure 1C:
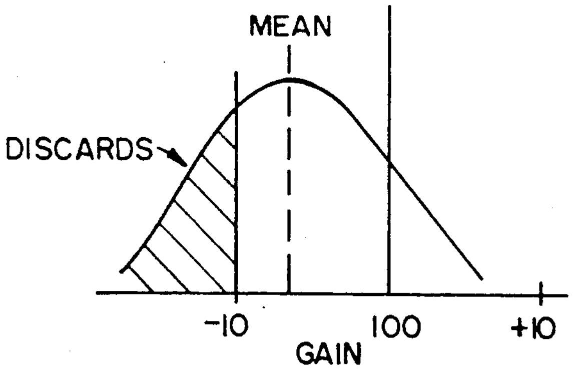
Figure 1D:
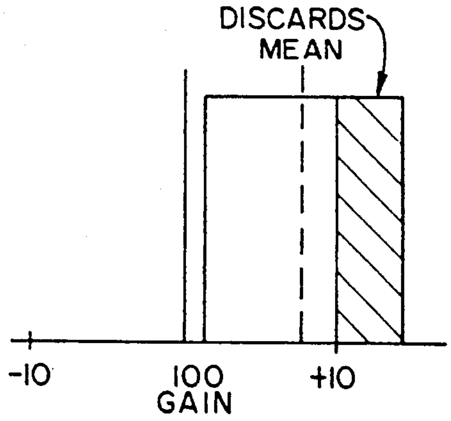
Figure 1E:
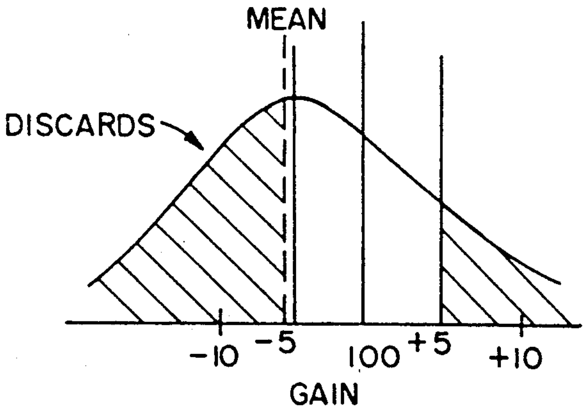
Figure 1F:
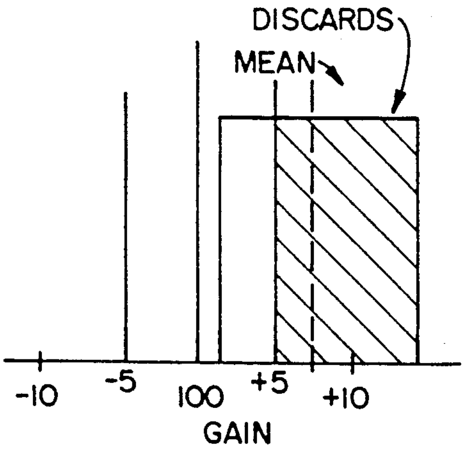

The microelectronic industry has developed technology to provide components such as very large integrated circuits (ICs), hybrid devices, etc. at very reasonable prices. Throw-away circuit cards and assemblies are now often more cost effective than proceeding through a repair process. In addition, numerous expendable products are being developed, and the bottom line costs of these expendable devices is dictated by the manufacturing cycle time and component (ICs, hybrid, etc.) costs. The cost driver in the end product is the output yield achieved by the manufacturing process, the cost and productivity of the rework cycle, and the cost of the components used in the device.

For example, consider the cost to produce 1000 electronic products in a process that has a 50% yield and a 20% rework success factor. Assuming component costs of $5000 per unit, a 6 hour manufacturing cycle per unit, a 6 hour rework cycle per unit, and that of the 50% of the units not meeting specifications, one-half enter the rework cycle and the rest are scrapped. The 20% rework success factor is derived from an 80% success in rework of 50% (one-half entering rework) of 50% of the units not meeting specifications. The costs would be:

1) Component sets required to achieve 1000

(1) Component sets required to achieve 1000

$$\text{units} = \frac{1000}{.7} = 1429 \text{ (50\% baseline yield + 20\% rework yield = 0.7)}$$

Component Costs = 1429 × $5000 = $7.145M (2) Labor Costs @ $50/hour =

| | | |
|---|---|---|
| Basic run | 1429 × 6 hrs. × $50 = | $428.7K |
| Rework | 357 × 6 hrs. × $50 = | 107.1K |
| | | $535.8K |

3) The 1000 units are achieved as follows:

715 from first run (50% yield) plus 285 from the 357 entering rework (80% of the units entering rework)

4) The total cost for 1000 units is:

$7.145M+$0.536=$7.681M

If a 100% yield had been achieved, the cost of producing 1000 units would have been:

| | | |
|---|---|---|
| Components 1000 × 5000 | = | $5M |
| Labor 1000 × 6 × $50 | = | 300K |
| TOTAL | = | $5.3M |

In summary, the yield impact was $2.381M or a 45% increase over a perfect run.

The yield in the above example is attributed to three factors:

a) workmanship—some units will be damaged or destroyed in the manufacturing process;

b) faulty components—unacceptable units due to components that do not function properly or fail due to infant mortality; and c) tolerance build-up—a suboptimum combination of components that yield an out of specification final product.

Increased automation and improved manufacturing equipment and techniques can increase the workmanship yield, and increased inspection, testing and burn-in can improve the yield despite faulty components. The reduction of yield due to tolerance build-up can be addressed by tightening tolerances on individual components or by understanding a priori, the nature and magnitude of the tolerance build-up problem in a given manufacturing run, and taking steps to minimize the yield of unacceptable products caused by a mismatch of components.

If consideration is given to various component (e.g., ICs, hybrids, etc) characteristics such as gain, frequency response, sensitivity, etc. and the kinds of statistical distributions as which might be achieved during manufacture, the distributions shown in FIG. 1 might be typical. Considering a component characteristic such as gain, where a gain of 100 is desired and a variation of plus or minus 10 is the specified limit, FIGS. 1A and 1B show ideal yields for respectively a normal distribution and a uniform distribution where close to 100% meet specification limits. However, from one manufacturing run to another, variations can be expected in the mean as well as in the distribution, and FIGS. 1C and 1D might be more typical. In the case of a normally distributed run, most components are on the low gain side of the tolerance and a yield of perhaps 60–70% is achieved. The uniformly distributed case shows a mean on the plus side with a yield similar to FIG. 1C. FIGS. 1E and 1F show the impact of tightening the tolerance to a gain of 100±5. This shows a yield of perhaps 30–40% in the normally distributed case and only 25% in the uniformly distributed run. Accordingly, tightening the tolerance would translate to a proportional increase in the cost of the components.

Ideally, it is desirable to be able to use all or most of the components in a given production run, thus reducing the cost per unit.

The present invention provides a technique for maximizing the yield at the component level while maintaining a low rejection rate due to tolerance build-up in the final product. Pursuant thereto, during the product design phase, a mathematical or computer model is developed of the product with each important component tolerance reflected therein. Different statistical distributions reflecting anticipated/possible component production runs are evaluated by the model to assess the sensitivity of the end item performance to component variations. The output of the model is a statistical estimate of the yields for different combinations of components with different tolerances. The model is based on an analytical definition of the product, or can be developed empirically using a laboratory setup. The model would be capable of providing insight into issues such as:

What is the best combination of component lots to maximize yield?

Should a particular component lot be 100% inspected/tested?

Should a lot be sorted and selectively used with other components?

Should additional components be ordered to cover a projected shortage thereof?

The developed model can be used during the production phase for a variety of efficiency/cost reduction purposes. In a simple case it could be used as a safeguard to determine if a marginal batch of a particular component, if introduced into the production line, would result in an unacceptable yield over that particular production run. It could be used to determine when sample testing of a component lot will provide acceptable yield, or when 100% testing is required at incoming inspection. It could also be used to allow the selective choice of component tolerances to achieve high component production yields and accompanying lower costs. Moreover, it could be followed by a mix and match assembly process to optimize yield of the end product. The model might be utilized to allow a manufacturing facility to have total control/visibility over the stocking of components by batch and batch characteristic so that manufacturing combinations can be selected from combinations of component batches to achieve maximum yield.

Electronic assemblies and devices are typically fabricated using integrated circuits (IC's), hybrids, microwave monolithic integrated circuits (MMIC's) and other microelectronic devices for a variety of applications including communications, radar and electronic warfare (EW). The modeling technique described herein is applicable to most of these products, and in most cases could be applied to expendable electronic modules and assemblies.

Figure 2:
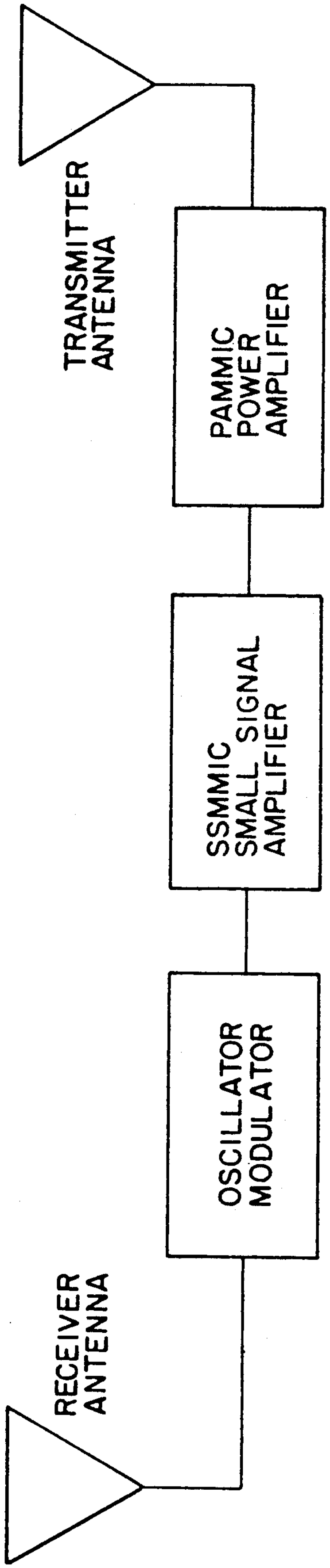
FIG. 2 illustrates an exemplary embodiment of an electronic product which can be assembled to maximize the yield thereof pursuant to the teachings of the present invention.

A simple expendable EW decoy is a good example of the application of the modeling technique of the present invention. An EW decoy is intended to deceive an enemy radar by producing a signal that appears to the radar to be the same as a real target of interest such as an aircraft, ship or other high value target. The transmitted return signal might have modulation introduced thereon to further confuse a radar operator or missile seeker. FIG. 2 shows a block diagram for a typical EW decoy. A radar signal is detected by a receiving antenna 12, operated on by an oscillator/modulator 14, amplified by a small signal MMIC 16, amplified by a power amplifier MMIC 18, and retransmitted at high power through a transmitter antenna 20. Switching or isolation between the receiving and transmitting antennas is required to prevent self jamming. To be an effective product, the EW decoy must produce some minimum level output power which is defined by the size of the radar target to be screened and the type of radar being countered.

As an example, consider that the primary pass-fail criteria for an EW decoy as shown in FIG. 2 is that it produce a radiated output power of 10 watts. The EW decoy is assembled from three MMIC (Microwave Monolithic Integrated Circuits) and hybrid devices and antennas. The nominal design values of MMIC's/antenna are:

Oscillator Output Power $=P_1=1.0$ milliwatt
Small Signal Amplifier Gain $=K_1=100$
Power Amplifier Gain $=K_2 100$
Antenna Gain $=K_3=1$ $$\text{so: Power Output} = P_0 = P_1 \times K_1 \times K_2 \times K_3$$
$$P_0 = 1 \times 10^{-3} \times 100 \times 100 \times 1$$
$$PO = 10 \text{ watts}$$

Each MMIC chip is typically fabricated in a foundry by etching and treating a silicon or gallim arsenide wafer with appropriate microcircuit traces and components. Typically a single wafer yields several hundred MMIC. Normally there are differences in performance parameters from chip to chip within a wafer, and in different batches (from wafer to wafer). By sample testing a number of chips in each wafer, the performance distribution of the population of chips can be characterized, and the type of distribution (e.g. uniform, Gaussian, etc.) and its mean (m) and variance (o) can be quantified. A production run of decoys could typically be in the thousands, and accordingly MMIC's from many different wafers would be required to satisfy the production quantity. An objective of the present invention is to select optimum combinations of component manufacturing lots or production batches to yield the maximum quantity of EW decoys with greater than 10 watts output power. If consideration is given to four manufacturing runs for each MMIC, each with a different performance distribution, the problem is to define which batch or lot of oscillators should be combined with which batch or lot of small signal amplifiers (SSA), with which batch or lot power amplifiers (PA), and with which antennas to maximize the yield of acceptable EW decoys.

Figure 3:
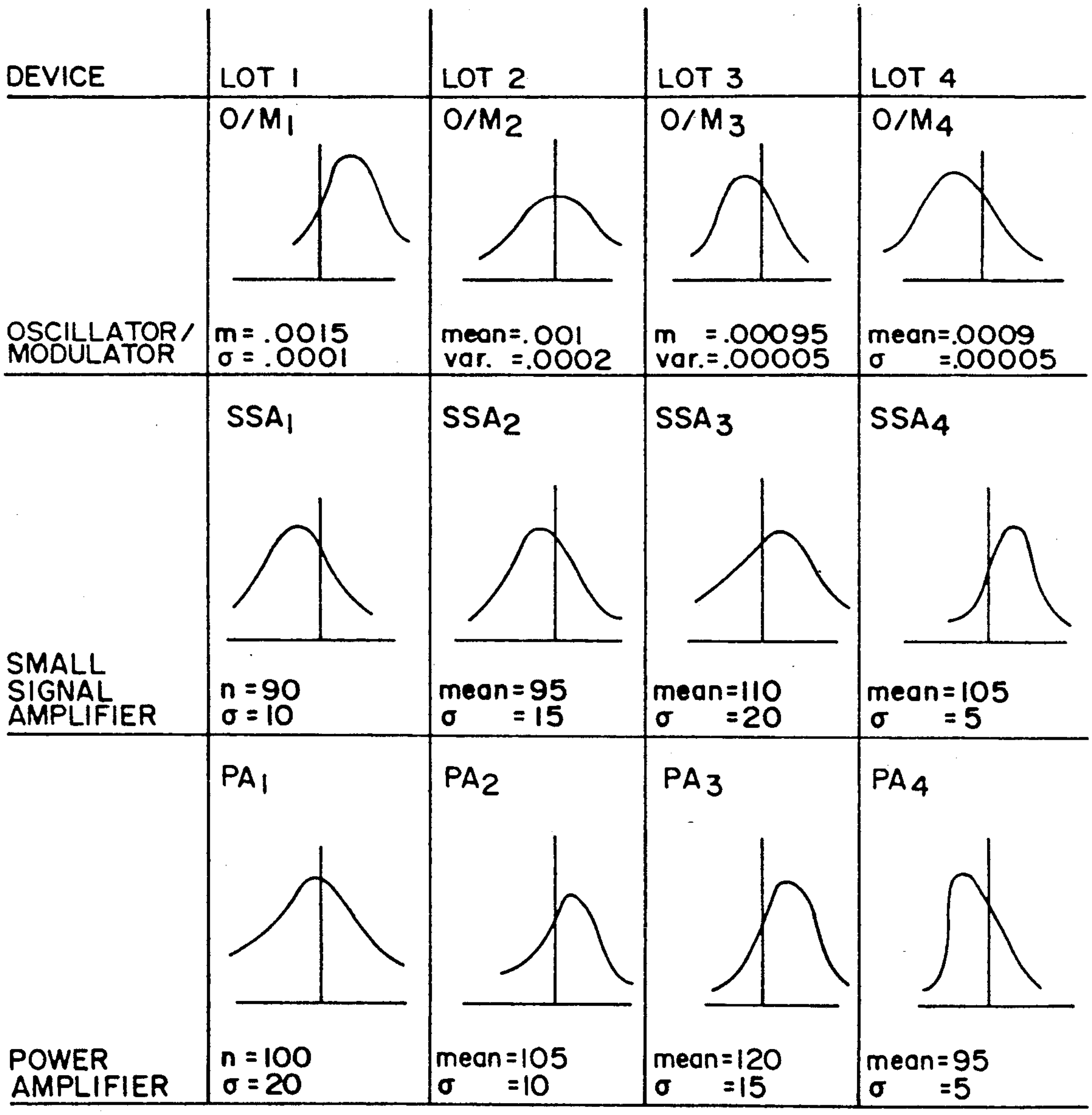
FIG. 3 illustrates examples of statistical distributions of significant electronic parameters of different major electronic components from different manufacturing lots or production runs used in the assembly of the product of FIG. 2, with each electronic component having a normal distribution with a defined mean (m) and variance (o)

FIG. 3 shows statistical distributions as might be typically expected, considering the use of 4 batches or lots of 250 MMIC modules and antennas in order to get as close to 1000 EW decoys as possible.

In order to model the product to assess the impact of each distribution, the mean and variance of the final products $P_0$ must be determined based upon different possible combinations of components. The mean $P_0$ of the final EW decoy can be expressed as the product of the mean values of the four major components. To compute the new variance, the Central Limit Theorem is applied, and the root sum square is taken of each variance multiplied by its gain factor in the equation. To simplify the example, the antennas are assumed to have been selected to yield a $K_3$ of 1, and accordingly the variance of $P_0$ can be expressed as:

$$\sigma P_0 = \sqrt{\frac{dp_o^2}{p_1} + \frac{dp_o^2}{k_1} + \frac{dp_o^2}{k_2}}$$

with $$\frac{dp_o}{p_1} = dp_1 (k_1 \times k_2)$$

$$\frac{dp_o}{k_1} = dk_1 (p_1 \times k_2)$$

-continued $$\frac{dp_o}{k_2} = dk_2\,(p_1 \times k_1)$$

$$m_{poa}=m_{p1a}\times m_{k1a}\times m_{k2a}$$

The resulting distribution of EW decoys is shown in FIG. 3 as a normal distribution with the previously defined mean (m) and variance (o).

The percent of rejects anticipated in a run should be minimized by proper lot selection. The number of rejects can be expressed as:

$$Q_R = A\int_{-\infty}^{10} \frac{1}{\sigma_a\sqrt{2\pi}}\, e^{-\frac{1}{2}\frac{(x-m_a)^2}{\sigma_a^2}}\,dx$$

where

A=maximum possible yield $o_a$=standard deviation of lot combination a $m_a$=mean of lot combination a The production runs of components shown in FIG. 3 can be combined into decoys in 64 different combinations. The goal is to obtain the maximum yield by selecting the mutually exclusive combinations that come closest to the maximum possible yield of A.

The equations above can be expressed in terms of the error function of z (ERF (z)):

$$Z = \frac{(x-m)}{o}$$

where x=10 watts (acceptable value)

m=mean of the combination o=variance of the combination

Once z is calculated for each combination, the resulting yield can be calculated by selecting the best mutually exclusive combinations of component lots. Groupings can be expressed as follows:

(O/M, Lot 1) (SSA Lot 1) (PA Lot 1) is designated 111

(O/M, Lot 2) (SSA Lot 1) (PA Lot 4) is designated 214 and so forth.

For 311

$$\frac{dp_{a1}}{p_1} = (.00005)\,(90)\,(100) = .45$$

$$\frac{dp_{a1}}{k_1} = (10)\,(.00095)\,(100) = .95$$

$$\frac{dp_1}{k_2} = (20)\,(.00095)\,(90) = 1.71$$

and $$\sigma_{p311} = \sqrt{(.45)^2 + (.95)^2 + (1.71)^2} = 2.007$$

and $$mp_{311}=(0.00095)\,(90)\,(100)=8.55$$

The value of $z_{111}$ can be calculated as $$z_{311} = \frac{10-8.55}{2.007} = .722$$

The next step is to look up the ERF of z111 and multiply by the quantity in question (750).

FIG. 4 is a table of ERF where:

Probability of a value $>x=0.5-erf(x)$

Probability of a value $\leqq x=erf(x)$

To obtain an accurate picture, the z of each of the combinations should then be calucalted. For example, the mean and variance of the 4 combinations of one mutually exclusive group of candidates is as follows for the combination of 144, 211, 322, 433.

$$m_{144} = (.0015)\,(105)\,(95) = 14.96 \qquad 144$$

$$\sigma_{144} = \sqrt{[(.0001)\,(105)\,(95)]^2 + [(.0015)\,(5)\,(95)]^2 + [(.0015)\,(5)\,(105)]^2}$$

$$\sigma_{144} = 1.457$$

$$m_{211} = (.001)\,(90)\,(100) = 9.0 \qquad 211$$

$$m_{211} = \sqrt{[(.0002)\,(90)\,(100)]^2 = [(.001)\,(10)\,(100)]^2 + [(.001)\,(90)\,(20)]^2}$$

$$\sigma_{211} = 2.735$$

$$m_{322} = (.00095)\,(95)\,(105) = 9.476 \qquad 322$$

$$\sigma_{322} = \sqrt{[(.00005)\,(95)\,(115)]^2 + [(.00095)\,(15)\,(105)]^2 + [(.00095)\,(95)\,(10)]^2}$$

$$\sigma_{322} = 1.817$$

$$m_{433} = (.0009)\,(110)\,(120) = 11.88 \qquad 433$$

$$\sigma_{433} = \sqrt{[(.00005)\,(110)\,(120)]^2 + [(.0009)\,(20)\,(120)]^2 + [(.0009)\,(110)\,(15)]^2}$$

$$\sigma_{433} = 2.703$$

The value for z for each is:

$$z_{144} = \frac{10-14.96}{1.457} = -3.40$$

$$z_{211} = \frac{10-9}{2.735} = 0.360$$

$$z_{322} = \frac{10-9.476}{1.817} = 0.29$$

$$z_{433} = \frac{10-11.88}{2.703} = -0.696$$

From FIG. 4

$erf(z_{144})=100\%$ $erf(z_{211})=36\%$ $erf(z_{322})=38\%$ $erf(z_{433})=76\%$ The total yield assuming 250 components in each lot is:

| | |
|---|---|
| 250 × 100% = | 250 |
| 250 × 36% = | 90 |
| 250 × 38% = | 95 |
| 250 × 76% = | 190 |
| | 625 units or 62.5% yield |

For the combination of 311, 222, 133, 444:

$$m_{311} = (.00095)\,(90)\,(100) = 8.55$$ 311

$$\sigma_{311} = \sqrt{[(.00005)\,(90)\,(100)]^2 + [(.00095)\,(10)\,(100)]^2 + [(.001)\,(95)\,(10)]^2}$$

$$\sigma_{311} = 2.007$$

$$m_{222} = (.001)\,(95)\,(105) = 9.97$$ 222

$$\sigma_{222} = \sqrt{[(.0002)\,(95)\,(105)]^2 + [(.001)\,(15)\,(105)]^2 + [(.001)\,(95)\,(10)]^2}$$

$$\sigma_{222} = 2.714$$

$$m_{133} = (.0015)\,(110)\,(120) = 19.80$$ 133

$$\sigma_{133} = \sqrt{[(.0001)\,(110)\,(120)]^2 + [(.0015)\,(20)\,(120)]^2 + [(.0015)\,(110)\,(15)]^2}$$

$$\sigma_{133} = 4.564$$

$$m_{444} = (.0009)\,(105)\,(95) = 8.98$$ 444

$$\sigma_{444} = \sqrt{[(.00005)\,(105)\,(95)]^2 + [(.0009)\,(5)\,(95)]^2 + [(.0009)\,(105)\,(5)]^2}$$

$$\sigma_{444} = .809$$

The value of z for each is:

$$z_{311} = \frac{10 - 8.55}{2.007} = -.722$$

$$z_{224} = \frac{10 - 9.97}{2.714} = 0.011$$

$$z_{133} = \frac{10 - 19.80}{4.564} = -2.147$$

$$z_{444} = \frac{10 - 8.98}{.809} = 1.264$$

From FIG. 4.

$erf(z_{311}) = 24\%$ $erf(z_{224}) = 50\%$ $erf(z_{133}) = 98\%$ $erf(z_{144}) = 10.6\%$ The total yield is

| | |
|---|---|
| 250 × 24% = | 60 |
| 250 × 50% = | 125 |
| 250 × 98% = | 245 |
| 250 × 10.6% = | 26 |

-continued

| |
|---|
| 456 units or 45.6% yield |

Clearly the first combination of components provides a significantly better yield than the second.

To implement this modeling approach for a production run, in a preferred embodiment the equations described above would be programmed in a PC or other computer, and the yield for all of the mutually exclusive combinations computed. The combination with the highest yield would then be selected for manufacture and the component lots separated into manufacturing groups containing the proper combinations.

While several embodiments and variations of the present invention for a method of modeling the assembly of products to increase production yield are described in detail herein, it should be apparent that the disclosure and teachings of the present invention will suggest many alternative designs to those skilled in the art. For instance, although the disclosed embodiments herein are directed to electronic products, the teachings of the present invention are also applicable to mechanical and mechanical/electrical products assembled from a plurality of different components such as automotive and aircraft and machinery products.

What is claimed is:

1. A method of assembling a product assembled from a plurality of components, with the components being available from multiple manufacturing lots, to increase the yield of products having acceptable performance characteristics, comprising:

a. testing significant performance parameters of components of each manufacturing lot of each major component used in the assembly of the product to establish the statistical characteristics of the significant performance parameters of each manufacturing lot of each major component used in the assembly of the product;

b. evaluating the statistically probable performance of the product assembled with different combinations of components form different manufacturing lots to assess the performance sensitivity of the product to different combinations of components from different manufacturing lots;

c. selecting the combinations of components from different manufacturing lots to achieve the highest yield of products with acceptable performance characteristics; and d. assembling products from the selected combination of components from different manufacturing lots to achieve the highest yield of products with acceptable performance characteristics.

2. A method of assembling a product according to claim 1, wherein said step of establishing the statistical characteristics of the significant performance parameters of each manufacturing lot of each major component comprises establishing the mean m and variance of each significant performance parameter of each manufacturing lot of each major component by sample testing thereof.

3. A method of assembling a product according to claim 2, wherein said step of evaluating the statistically probable performance of the product assembled with different combinations of components from different manufacturing lots comprises determining the mean m and variance o of the assembled product for all different possible combinations of the major components.

4. A method of assembling a product according to claim 3, wherein the product is an electronic product assembled from a plurality of electronic components, and said step of establishing comprises establishing the statistical characteristics of the significant electronic parameters of each manufacturing lot of each major electronic component used in the assembly of the electronic product.

5. A method of assembling a product according to claim 1, wherein the product is an electronic product assembled from a plurality of electronic components, and said step of establishing comprises establishing the statistical characteristics of the significant electronic parameters of each manufacturing lot of each major electronic component used in the assembly of the electronic product.

* * * * *

UNITED STATES PATENT AND TRADEMARK OFFICE

CERTIFICATE OF CORRECTION

PATENT NO. : 5,047,947

DATED : September 10, 1991

INVENTOR(S) : Joseph W. Stump

It is certified that error appears in the above-identified patent and that said Letters Patent is hereby corrected as shown below:

Column 6, line 5: "$K_2$100" should read as --$K_2$=100--

Column 7, line 17: "$\sigma$ $a^2$" should read as -- $\sigma^2$a--

Column 8, line 11: "calucalted" should read as --calculated--

Column 9, line 61: "($z_{144}$)-- should read as --($z_{444}$)--

Column 10, line 42, Claim 1: "form" should read as --from--

Column 10, line 58, Claim 2: "variance of" should read as --variance o of--

Signed and Sealed this

Ninth Day of March, 1993

*Attest:*

STEPHEN G. KUNIN

*Attesting Officer*

*Acting Commissioner of Patents and Trademarks*